July 24, 1956     W. A. FIANT     2,755,968

RUBBER TIPPED NOZZLE

Filed Dec. 13, 1952

*INVENTOR.*
WESLEY A. FIANT

BY

*Jerome R. Cox*

United States Patent Office 2,755,968
Patented July 24, 1956

2,755,968

RUBBER TIPPED NOZZLE

Wesley A. Fiant, Delaware, Ohio

Application December 13, 1952, Serial No. 325,763

9 Claims. (Cl. 222—121)

The invention disclosed in this application relates to hollow plug connections. The embodiments illustrated are connections which may be mounted on one end of a pipe or other conduit and inserted securely into a round hole in masonry or wooden structure so that chemical (which is preferably liquid but might be gas or powder) under pressure may be forced into the hole in said structure to permeate the interior of said structure. Such a device is especially useful in the treating of buildings with termite control chemical which is thus forced into the walls of buildings. The device is also useful for forcing other things into concrete and other structures. Prior hereto many nozzles of various types have been provided for various purposes. However, so far as I am aware, there has been no nozzle provided which is satisfactory for use as a nozzle for forcing termite control chemical into the walls of a building, which can be manufactured cheaply and economically and which is formed of a minimum of simple parts.

Prior art devices having resilient conduits connected to the nozzle are unsatisfactory for my use inasmuch as the high pressures (from 12–120 p. s. i.) involved will be in such case force the nozzle from contact with the opening and thus prevent the driving of the chemical into the walls where desired. Constructions where the resilient member is formed with annular grooves are unsatisfactory for my purposes inasmuch as thereby the chemical may escape from the hole into which the member is inserted, especially where the grooves coincide with the opening. It should be remembered in this connection that the hole in the wall of the building is usually itself of uniform diameter rather than tapered, being normally formed by an auger.

Structures in which the connecting conduit is a flexible member which is secured to the outside of the nozzle are unsatisfactory also in that thereby the resilient conduit is likely to be severed from the nozzle by reason of the high pressures involved. Moreover, in such cases, difficulty will be encountered as stated above in holding the nozzle tightly in the opening against such high pressures where the conduit is itself flexible.

One of the objects of my invention is the provision of a new and useful nozzle useful for forcing termite control chemical into the walls of buildings.

A further object of my invention is the provision of a new and useful nozzle which may be manufactured cheaply and of a minimum of metal and rubber parts of simple shape and economical construction.

A feature of my invention is the combination of a stepped tubular member having an internal thread in the hollow of the larger end thereof, having the smaller end thereof of uniform diameter throughout its length with a simple annular metallic washer which is welded thereto, and with a hollow substantially conical rubber member backed by the washer.

A further feature is the provision in certain embodiments of a shield for preventing back spray of chemical.

Further objects and features of the invention will be apparent from the subjoined specification and claims when considered in connection with the accompanying drawings illustrating one embodiment of my invention.

Figure 1:
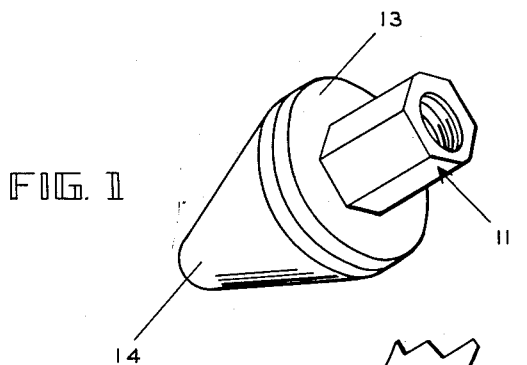
Fig. 1 is a view in perspective of a nozzle constructed according to my invention.
Figure 2:
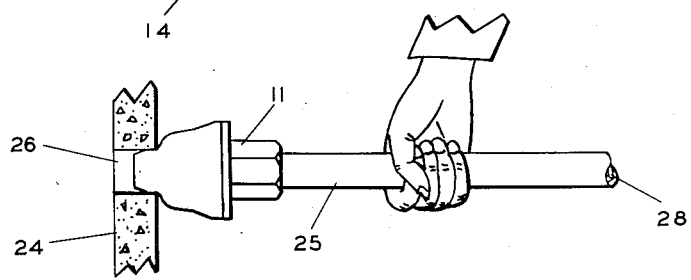
Fig. 2 is a more or less diagrammatic view showing the use of the nozzle in treating a building.
Figure 3:
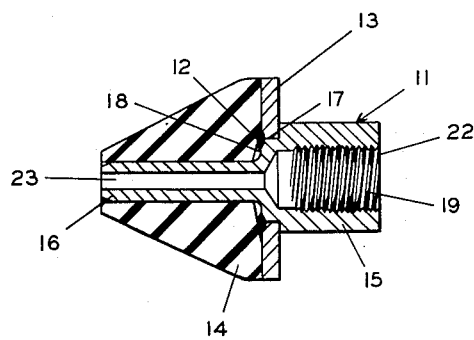
Fig. 3 is a view in vertical section of the nozzle shown in Fig. 1.

Referring to the drawings for a more detailed description of the embodiments of my invention shown, it may be seen that I have shown in Figs. 1, 2 and 3 a stepped tubular member 11 having welded thereto as at 12 a flat annular washer 13 and having positioned on the smaller end of the stepped member 11, a hollow frusto conical rubber contact member 14. The tubular member 11 consists substantially of two uniform integral tubular portions which may be designated as 15 and 16, the portion 15 having a much larger diameter than the portion 16. The member 11 could be machined from hexagonal tube or rod stock if desired. Intermediate the portions 15 and 16 there are a pair of steps or shoulders 17 and 18. The portion 15 has an internal bore 19 which is threaded as at 22 and the smaller portion 16 has a much smaller bore 23 extending throughout the length of the portion 16 and connecting with the bore 22. The flat annular washer 13 fits over the tubular member 11 and rests on the shoulder 17. It is welded thereto by welds such as 12 and serves as a backing for securely supporting the frusto conical hollow rubber member 14. The frusto conical hollow rubber member 14 rests upon the shoulder 18 and upon the surface of the washer 13 so that it is solidly supported thereby. The interior bore 22 of the larger portion 15 of the tubular member 11 is threaded as at 19 to receive a metal tubular conduit by which chemical is introduced into the nozzle and through the nozzle into the walls of the building being treated. The rubber contact member 14 is formed with a central bore or opening 21 through which the smaller portion 16 of the member 11 extends.

Figure 4:
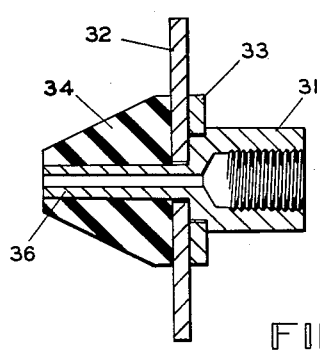
Fig. 4 is a view in vertical section of a modified form of nozzle.

I wish to here point out that by making the washer 13 separate from the member 11 the cost of my nozzle is decreased tremendously over the cost which would be involved were the metal parts of the nozzle machined from an integral piece of metal. As shown in Fig. 4, the washer need not be welded to the tubular member, although I consider welding preferable.

In Fig. 2 there is shown a wall 24 of a building, a cylindrical hole 26 having been formed in the wall 24. In this hole 26 the nozzle 11 is inserted. The nozzle 11 is screwed onto the metal tube 25 which connects the nozzle 11 to an outlet for the high pressure source of supply 28 of termite chemical.

The assembly of my nozzle is simple. The washer 13 is first added to the member 11 so that it rests on the shoulder 17. It is then welded to the member 11. The rubber member 14 is then added so that it is backed firmly by the washer 13.

The operation is also simple. After the nozzle is secured to the supply, a pressure relief valve at the source of supply is set at a suitable pressure, 80 p. s. i. being often used. Then the nozzle is inserted and held firmly in an opening such as the opening 26. The chemical is then supplied under high pressure and is forced into and permeates the wall of the building. When the building is permeated, the pressure is turned off and the nozzle removed from the opening.

In Fig. 4 there is shown a modified embodiment of my invention. This nozzle has a stepped tubular metal member 31, a metal washer 33 assembled therewith but not welded thereto, a spray shield 32 also assembled therewith and a hollow frusto conical rubber contact member 34 surrounding the integral relatively small diameter tubular portion 36 of the member 31. The friction of the member 34 on the portion 36 holds the shield 32 and the washer 33 in place in the assembly. The washer 33 provides a strong backing for both the rubber member 34 and the portion of the shield 32 on which the high pressure of the member 34 impinges. The shield 32 may be of metal but preferably is of a transparent material such as plastic. It prevents the possibility of back spray of chemical striking the face or other portion of the operator when the nozzle is being removed from the opening or should it be inadvertently loosened therefrom.

The assembly of this embodiment of my invention is similar to the assembly of the embodiment of Figs. 1–3, inclusive, except that the washer 33 is not welded, the shield 32 is put on over the portion 36 after the washer 33 and thereafter the rubber member 34 is put on. The operation of this embodiment is identical with the operation of the embodiment first described.

It is to be understood that the above described embodiment of my invention is for the purpose of illustration only and modifications thereof may be made without departing from the spirit and scope of my invention if comprehended by the appended claims.

I claim:

1. A nozzle for supplying termite chemical into the walls of a building comprising a tubular metal member having a relatively large portion formed with a substantially uniform diameter central bore, a relatively small portion also formed with a substantially uniform diameter central bore and being integral with the large portion and having its bore substantially smaller than but aligned and connected with the bore of the large portion so that the velocity of chemical when forced through the smaller bore is substantially greater than the velocity of the chemical forced through the larger bore; a flat annular metal washer surrounding said small portion and supported by said tubular member; and a hollow tapered resilient member having a smooth exterior surface, surrounding and supported by said small portion and bearing at its larger end against said washer.

2. A nozzle for supplying termite chemical into the walls of a building comprising a tubular metal member having a relatively large tubular portion formed with a substantially uniform outer diameter and with a substantially uniform diameter central bore, a relatively small tubular portion also formed with a substantially uniform outer diameter and with a substantially uniform diameter central bore and being integral with the large portion and having its bore substantially smaller than but aligned and connected with the bore of the large portion so that the velocity of chemical when forced through the smaller bore is substantially greater than the velocity of the chemical forced through the larger bore; a flat annular metal washer surrounding said small portion and supported by said tubular member and welded to said tubular member; and a hollow frustoconical resilient member having a uniform diameter inner bore and a smooth exterior surface, surrounding said small portion and supported by said small portion and bearing at its larger end against said washer.

3. A nozzle for supplying termite chemical into the walls of a building comprising a tubular metal member having a relatively large tubular portion formed with a substantially uniform outer diameter and with a substantially uniform diameter central bore, which is provided with an internal screw thread, a relatively small tubular portion also formed with a substantially uniform outer diameter and with a substantially uniform diameter central bore and being integral with the large portion; a flat annular metal washer surrounding said small portion and bearing on said tubular member; and a hollow frustoconical resilient rubber member having a uniform diameter inner bore and a smooth exterior surface, sleeved onto said small portion so that it is supported throughout its length thereby, and bearing against the said washer.

4. A nozzle for supplying termite chemical into the walls of a building comprising a tubular metal member having a relatively large tubular portion formed with a substantially uniform outer diameter and with a substantially uniform diameter central bore, which is provided with an internal screw thread, a relatively small tubular portion also formed with a substantially uniform outer diameter and with a substantially uniform diameter central bore and being integral with the large portion and having its bore substantially smaller than but aligned and connected with the bore of the large portion so that the velocity of the chemical when forced through the smaller bore is substantially greater than the velocity of the chemical forced through the larger bore and the exterior of said member being formed so that a pair of steps are provided intermediate said portions; a flat annular metal washer surrounding said small portion bearing on one of said steps and welded to said tubular member; and a hollow frustoconical resilient rubber member having a uniform diameter inner bore and a smooth exterior surface, sleeved onto said small portion so that it is supported throughout its length thereby, and bearing against the said washer and the other said step.

5. A nozzle for supplying termite chemical into the walls of a building comprising a tubular metal member having a relatively large tubular portion formed with a substantially uniform outer diameter and with a substantially uniform diameter central bore, a relatively small tubular portion also formed with a substantially uniform outer diameter and with a substantially uniform diameter central bore and being integral with the large portion and having its bore substantially smaller than but aligned and connected with the bore of the large portion so that the velocity of chemical when forced through the smaller bore is substantially greater than the velocity of the chemical forced through the larger bore; a flat annular metal washer surrounding said small portion and supported by said tubular member; a shield surrounding said small portion and also supported by said tubular member; and a hollow tapered resilient member having a uniform diameter inner bore and a smooth exterior surface; sleeved onto said small portion so that it is supported throughout its length thereby and bearing at its larger end against said washer.

6. An implement for supplying termite chemical into the walls of a building comprising a rigid metal tube and a nozzle secured thereto, the nozzle consisting of a tubular metal member having a relatively large portion formed with a substantially uniform diameter central bore, which is provided with an internal screw thread into which the rigid metal tube is threaded, a relatively small portion also formed with a substantially uniform diameter central bore and being integral with the large portion and having its bore substantially smaller than but aligned and connected with the bore of the large portion so that the velocity of chemical when forced through the smaller bore is substantially greater than the velocity of chemical forced through the larger bore and the exterior of said member being formed so that a pair of steps are provided intermediate said portions; a flat annular metal washer surrounding said small portion bearing on one of said steps and welded to said tubular member; and a hollow frustoconical resilient rubber member having a smooth exterior surface, surrounding said small portion throughout the length thereof and supported by said small portion, and bearing against the said washer and the other said step at its larger end.

7. A nozzle for supplying termite chemical into the walls of a building comprising a tubular metal member having a relatively large portion formed with a substantially uniform diameter central bore, a relatively small portion also formed with a substantially uniform diameter central bore and being integral with the large portion; a flat annular metal washer surrounding said small portion and bearing on said tubular member; a shield formed of transparent plastic surrounding said small portion and supported by said washer; and a hollow frustoconical resilient rubber member having a smooth exterior surface, surrounding said small portion throughout the length thereof and supported by said small portion, and bearing against the said washer at its larger end.

8. A nozzle for supplying termite chemical into the walls of a building comprising a tubular metal member having a relatively large tubular portion formed with a substantially uniform outer diameter and with a substantially uniform diameter central bore, which is provided with an internal screw thread, a relatively small tubular portion also formed with a substantially uniform outer diameter and with a substantially uniform diameter central bore and being integral with the large portion and having its bore substantially smaller than but aligned and connected with the bore of the large portion so that the velocity of chemical when forced through the smaller bore is substantially greater than the velocity of chemical forced through the larger bore, and the exterior of said member being formed so that a pair of steps are provided intermediate said portions; a flat annular metal washer surrounding said small portion bearing on one of said steps and welded to said tubular member; and a hollow frustoconical resilient rubber member surrounding said small portion throughout the length thereof and supported by said small portion and bearing against the said washer and the other said step at its larger end.

9. An implement for supplying termite chemical into the walls of a building comprising a rigid metal tube and a nozzle secured thereto, the nozzle consisting of a tubular metal member having a relatively large portion formed with a substantially uniform outer diameter and with a substantially uniform diameter central bore, which is provided with an internal screw thread, a relatively small portion also formed with a substantially uniform outer diameter and formed with a substantially uniform diameter central bore and being integral with the large portion and having its bore substantially smaller than but aligned and connected with the bore of the large portion so that the velocity of chemical when forced through the smaller bore is substantially greater than the velocity of chemical forced through the larger bore and the exterior of said member being formed so that a pair of steps are provided intermediate said portions; a flat annular metal washer surrounding said small portion bearing on one of said steps and welded to said tubular member; a transparent plastic shield surrounding said small portion and bearing on said washer; and a hollow frustoconical resilient rubber member having a uniform diameter central bore and having a smooth exterior surface, surrounding said small portion throughout the length thereof and supported by said small portion, and bearing against the said washer and the other said step at its larger end.

References Cited in the file of this patent

UNITED STATES PATENTS

| | | |
|---|---|---|
| 1,286,830 | Sturmer | Dec. 3, 1918 |
| 2,058,219 | Ehnts | Oct. 20, 1936 |
| 2,326,851 | Gray | Aug. 17, 1943 |